Aug. 30, 1960  J. J. BIEGER ET AL  2,950,635
MINIATURIZED GEAR REDUCER
Filed July 15, 1959  4 Sheets-Sheet 1

INVENTORS
JACOB J. BIEGER
ARTHUR T. HILL
BY
ATTORNEYS

Aug. 30, 1960    J. J. BIEGER ET AL    2,950,635
MINIATURIZED GEAR REDUCER
Filed July 15, 1959    4 Sheets-Sheet 2

INVENTORS
JACOB J. BIEGER
ARTHUR T. HILL
BY
ATTORNEYS

Aug. 30, 1960 J. J. BIEGER ET AL 2,950,635
MINIATURIZED GEAR REDUCER
Filed July 15, 1959 4 Sheets-Sheet 3
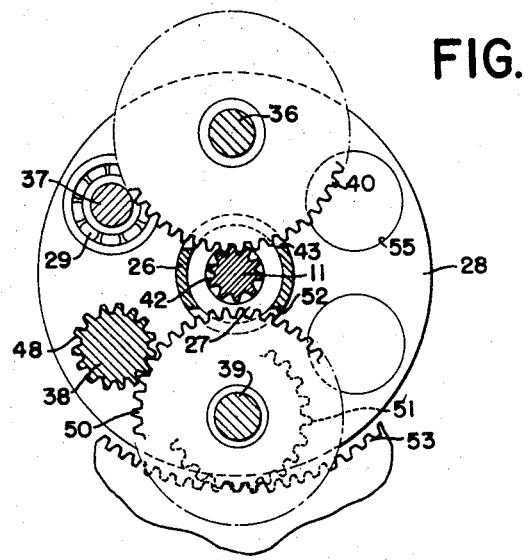
FIG. 5
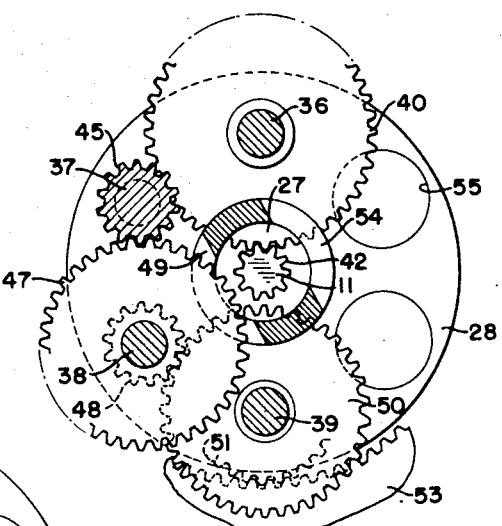
FIG. 6
FIG. 7
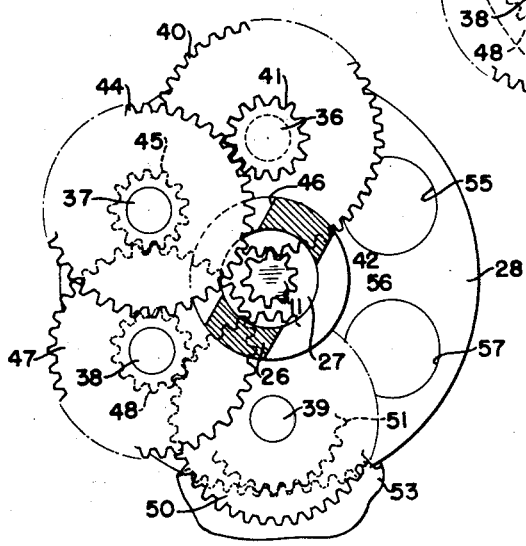
INVENTORS
JACOB J. BIEGER
ARTHUR T. HILL
BY
ATTORNEYS

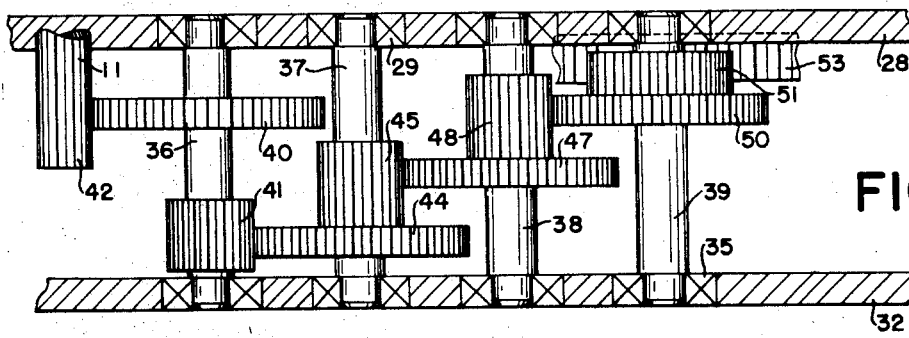
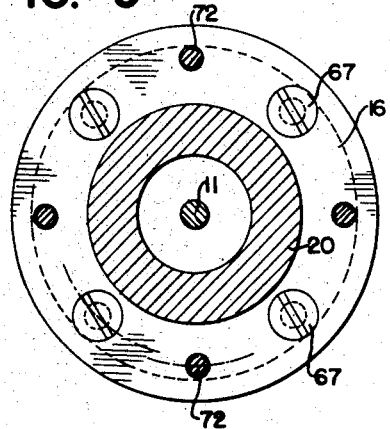
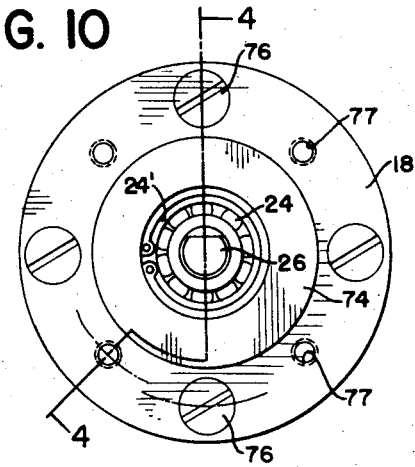
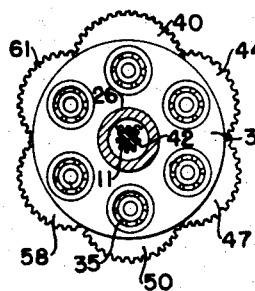
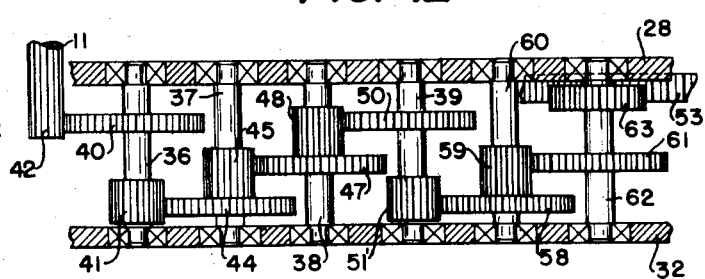

United States Patent Office 2,950,635
Patented Aug. 30, 1960

2,950,635

MINIATURIZED GEAR REDUCER

Jacob J. Bieger, Queens Village, and Arthur T. Hill, Elmont, N.Y., assignors to Daco Instrument Company, Brooklyn, N.Y., a partnership Filed July 15, 1959, Ser. No. 827,284

8 Claims. (Cl. 74—801)

The present invention relates to gear reducers, and more specifically to a novel and improved high-ratio gear reducer adapted especially for, although not necessarily limited to, use in combination with small electric motors conforming to military specifications.

In various mechanisms used for military purposes, for example, common use is made of small electric motors. Such motors, which may be on the order of an inch and one-half in diameter, for example, and of fractional horsepower, presently must conform to rigid specifications as to configuration, in order to provide interchangeability of motors in various mountings therefor. Frequently, it is desirable to utilize, in connection with such small motors, gear reduction means adapted for attachment to the front end of the motor casing and adapted, in turn, to have a front end configuration conforming to the military standards. The physical requirements of such a configuration have presented serious difficulties, heretofore, in connection with high-ratio gear reduction means, due to the substantial difficulty in housing a dependable, high-ratio gear mechanism in the extremely limited physical space afforded when the military standards are met in regard to outer configuration.

In accordance with the invention, a novel gear reduction mechanism is provided which is of a highly compact nature, capable of encasement in the greatly limited physical space provided in military units and yet substantially improved in its performance characteristics as compared to gear reduction devices of known types.

One of the specific aspects of the invention resides in the provision of a novel and improved gear reduction mechanism for the purpose and having the characteristics mentioned above, in which an output drive shaft, coaxial with the rotor shaft of the motor, is journalled at both ends of the housing of the mechanism. This feature represents a substantial improvement over known mechanisms, in which the output shaft is journalled only at the front of the housing, and is rendered possible by a novel arrangement of the elements of the mechanism, permitting one of the bearings of the output shaft to be located rearward of the forward end of the motor shaft.

Another specific feature of the invention resides in the provision of a gear mechanism of the type above described, in which the output shaft carries means forming a cage for supporting a plurality of rotating gear assemblies. The inner end of the output shaft is provided with an axial recess into which the motor shaft extends, and a recess is also provided in the side wall of the output shaft through which the motor shaft is exposed for engagement with one of the gears supported by the cage. Rotation of the motor shaft thus sets into motion a train of gears supported by the output shaft, and the last gear of the train meshes with a gear fixed to the housing of the mechanism, whereby positive rotation of the output shaft is effected. The improved arrangement is unusually compact and is highly versatile in that the gear reduction ratio may be varied readily by changing the number of gears in the train supported by the output shaft cage.

Another specific feature of the invention resides in the provision, in combination with the improved gear mechanism, of a novel housing structure and adapter means therefor enabling the housing to be secured to a motor conforming to military standard specifications and yet providing within the housing ample space to receive the working mechanism. In this respect, military specifications dictate the nature and location of mounting holes provided at the front end of small motors, and these requirements tend to be incompatible with the mounting, on the front of the motor, of a gear mechanism in which a relatively large cage of gears may rotate. In accordance with the invention, however, novel adapter means and housing structure are provided, whereby the free working area within the housing is increased to the extent necessary to accommodate a rotating cage of gears of the type incorporated in the new mechanism.

For a better understanding of the invention and for a further discussion of the above and other advantageous features thereof, reference should be made to the following detailed specification and to the accompanying drawings, in which:

Figs. 5–7 are enlarged, fragmentary, cross-sectional views taken generally along lines 5—5, 6—6 and 7—7, respectively, of Fig. 4;

Fig. 8 is a schematic representation, in developed form, of the gear system incorporated in the mechanism of Fig. 4;

Fig. 9 is a cross-sectional view taken generally on line 9—9 of Fig. 4;

Fig. 10 is a front elevational view, similar to Fig. 2, with an adapter ring removed from the front of the assembly;

Fig. 11 is a back elevational view of a gear cage, as used in the mechanism of Fig. 4, incorporating a greater number of gears to achieve higher reduction; and Fig. 12 is a simplified representation, in developed form, of the gear train of Fig. 11.

Figure 1:
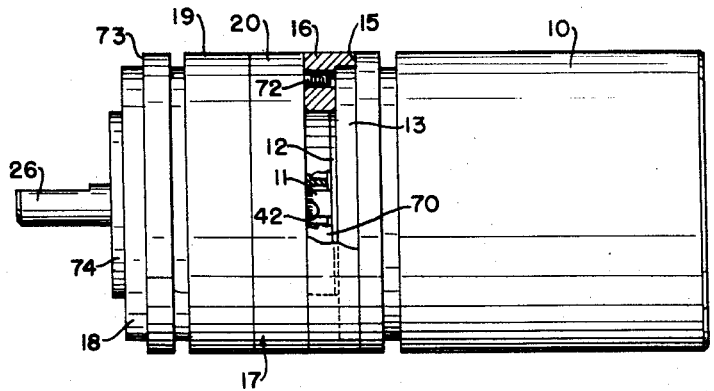
Fig. 1 is a side elevation, with parts broken away, of a combined motor and gear reduction mechanism incorporating the invention.
Figure 2:
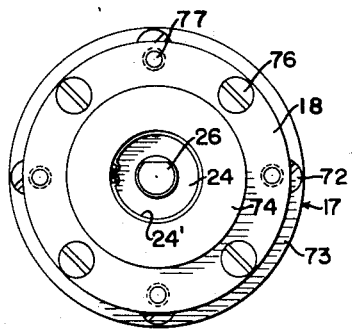
Fig. 2 is a front elevation of the assembly of Fig. 1.
Figure 3:
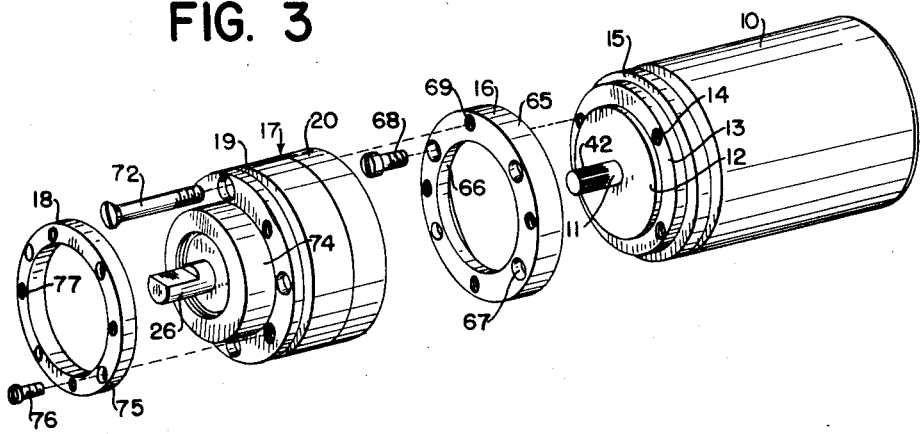
Fig. 3 is an exploded, perspective view of the combination assembly of Fig. 1.

Referring now to the drawings, the reference numeral 10 designates generally a small electric motor of the type conforming to military specifications. In this respect, the motor 10 is of cylindrical form and has a central shaft 11 projecting from its forward end. The forward end configuration of the motor, according to military specifications, includes a circular boss 12 of predetermined diameter and a first annular shoulder 13 of greater diameter having therein a plurality of tapped holes 14 located on a circle of predetermined diameter and spaced from each other in a specified manner. A third shoulder 15 also is provided, the outside diameter of which equals that of the motor casing generally.

In a manner to be described in greater detail herein, there is attached to the front end of the motor 10 a first adapter ring 16, a gear mechanism housing 17 and a second adapter ring 18. The adapters 16, 18 and gear housing 17 are, in effect, an assembly which is attached to the motor. However, actually, the first adapter 16 is secured to the motor, the gear housing 17 is secured to the first adapter and the second adapter 18 is secured to the gear housing.

Figure 4:
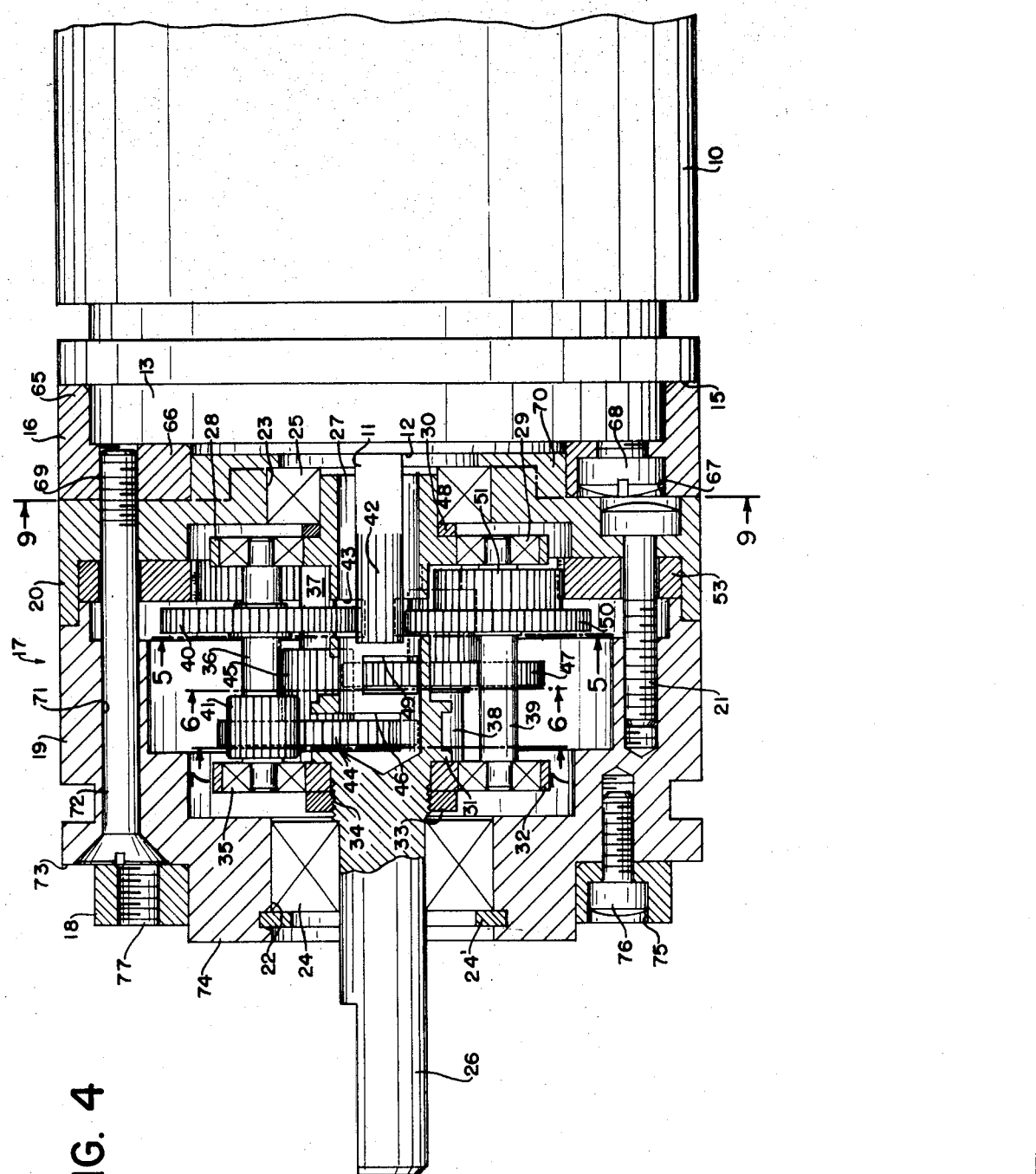
Fig. 4 is an enlarged, fragmentary, cross-sectional view of the gear mechanism of the invention, as taken generally along line 4—4 of Fig. 10.

Referring now to Fig. 4, it will be observed that the gear housing 17 is comprised primarily of two parts 19, 20, which are secured together by means of bolts 21. The outer diameter of the housing parts 19, 20, as well as that of the adapter ring 16, is the same as that of the motor housing 10. When the unit is assembled, the separate housing parts 19, 20 constitute, in effect, a unitary housing and reference may be had to the housing parts collectively as a housing 17.

Advantageously, the housing 17 is provided adjacent its front and rear ends with recesses 22, 23 receiving miniaturized, precision, anti-friction bearings 24, 25, respectively. The bearings are spaced as far apart as practicable and, in the mechanism of the invention, may be about ¾ of an inch apart in a unit of about 1½ inches in diameter and slightly over an inch in length. The bearings 24, 25 journal an output shaft 26, whose forward end projects forwardly of the gear housing 17 in the usual manner for connection to a mechanism to be driven.

In accordance with the invention, the output shaft 26 is provided with an internal axial recess 27, which receives the shaft 11 of the motor. This enables the motor shaft 11 to extend a substantial distance forward of the rear bearing 25 of the output shaft, in the desired manner.

Adjacent the rearward end of the output shaft 26, and advantageously integral therewith, is a radial flange 28, which is circular in form and which is provided at spaced points with suitable recesses for receiving miniature antifriction bearings 29. A small shoulder may be provided adjacent the base of the flange 28 to provide a surface engaging the main bearing 25, or a small collar 30 may be assembled on the shaft for this purpose.

Spaced forward of the rear flange 28 of the output shaft is a small flange 31 providing a forwardly facing shoulder to position an annular flange disc 32. The flange disc 32 is secured rigidly to the shaft 26 by means of a nut 33 engaging threads 34 on the shaft. After assembly and tightening of the nut 33, the flange disc 32 is, in effect, an integral part of the output shaft 26, like the flange 28. The disc 32 is also provided with a plurality of recesses for receiving miniature anti-friction bearings 35, it being understood that the recesses of the spaced flanges are arranged in coaxial pairs as shown.

Journalled in the pairs of bearings 29, 35 are shafts, which may vary in number, as will be explained, there being four such shafts 36–39 in the form of the invention illustrated in Figs. 1–10.

The shaft 36 has mounted thereon a gear set comprising a large diameter gear 40 and a small diameter gear 41, these gears constituting a first gear set. In accordance with the invention, the diameter of the gear 40 is such that it meshes with a gear 42 formed on the outer end of the motor shaft 11, a suitable recess 43 being provided in the output shaft 26 to expose the motor shaft gear 42 and receive the gear 40. The small gear 41 of the first set meshes with a large gear 44 comprising, with a small gear 45, a second gear set. The gear set 44, 45 is mounted on the shaft 37, adjacent the shaft 36, and the small gear 45 of the set is located in offset relation to the large gear 40 of the first set to avoid meshing of these gears. The gear 44 is of such diameter as to extend inward beyond the outline of the output shaft 26, and an appropriate recess 46 is provided in the shaft to accommodate the gear.

The shaft 38 mounts a third gear set, comprising a large diameter gear 47 and a small diameter gear 48. The large gear 47 meshes with the small gear 45 of the second set, and the small gear 48 is located in axially offset relation to the large gear 44, substantially as shown in Fig. 8. The gear 47, like the large gears 40, 44, is received in a recess 49 provided in the wall of the output shaft 26.

In the illustrated form of the invention, there are provided four gear sets, the last comprising gears 50, 51 mounted on the shaft 39. The gear 50 is of large diameter and is positioned to mesh with the small diameter gear 48 of the third set of gears. A recess 52 is provided in the output shaft 26 to accommodate the gear 50, as shown best in Fig. 5. The gear 51 of the fourth gear set is of a diameter such as to mesh with an internal ring gear 53 secured in the housing part 20 by means of the bolts 21. Accordingly, when the shaft 11 is rotated, the gear 51 will tend to be rotated at a speed corresponding to the compounded reductions achieved through the gear sets, as will be understood. However, since the gear 51 is unable to rotate freely, by reason of its meshing with the ring gear 53, the entire cage of gears rotates relative to the housing 17, carrying with it the output shaft 26.

As one of the advantageous features of the invention, the gear cage comprised of the flange 28 and flange disc 32 is provided with means for receiving six gear shafts, arranged in diametrically opposed pairs. In addition, the spacing of the flange and flange disc is such that three sets of gears may be arranged successively in staggered relation without interfering. Advantageously, diametrically opposed large diameter gears, such as the gears 40, 50, lie in the same plane and are received in shaft recesses, such as 43, 52, which are located diametrically opposite on the output shaft 26. Thus, in the machining of the shaft 26, it is advantageous to machine three pairs of recesses, as indicated in Figs. 5–7, with each pair being disposed at an angle to the others. In Fig. 6, for example, a recess 54 is provided opposite the recess 49, the recess 54 being unused in the first illustrated form of the invention, but being provided for the accommodation of a gear set supported in the bearing recess 55. Likewise, in Fig. 7, a recess 56 is provided opposite the recess 46, for the accommodation of a gear set supported in the bearing recess 57. As will be readily apparent, the improved arrangement provides for maximum compactness of the gear mechanism both in axial and radial dimensions.

As will be observed in Fig. 5, for example, the gear 50, though located opposite and lying in the same plane as the gear 40, is of slightly smaller diameter than the gear 40, so as to avoid meshing with the gear 42 on the motor shaft 11.

Figs. 11 and 12 illustrate the gear mechanism in which a maximum number of gear sets are employed. In general, the gear mechanism is the same, except that the gear set 50, 51 is comprised of the gear 50 together with a small diameter gear 51' which does not mesh with the internal ring gear 53. Rather, the gear 51' meshes with a large diameter gear 58 of a gear set 58, 59 carried by a shaft 60, the gear 58 being mounted opposite the gear 44 and being received in the recess 56 (Fig. 7). The small gear 59 of the gear set 58, 59 meshes with a large diameter gear 61 mounted on a shaft 62. The gear 61 is mounted opposite the gear 47 and is received in the recess 54 (Fig. 6). Also mounted on the shaft 62 is an output gear 63 of a diameter to mesh with the internal ring gear 53. The operation of the mechanism of Figs. 11 and 12 is the same as that of the first described mechanism, it being understood, however, that the reduction ratio of the second described embodiment will be substantially greater. In a like manner, the reduction ratio is subject to substantial variation by simply selecting the desired number of gear sets, which may be varied from one to six.

One of the advantageous features of the new mechanism is that the parts thereof may be standardized substantially throughout, yet the reduction ratio may be varied freely by appropriate selection of the gear sets. The maximum reduction ratio is also extremely high, in terms of the size of the mechanism, ratios on the order of 5000:1 being readily obtainable in a mechanism about an inch and one-half in diameter and slightly greater than one inch in length. Of course, the invention is not necessarily limited to mechanisms of specific size, but its advantages are realized best in miniaturized devices.

One of the important specific features of the invention resides in the provision of a novel housing and adapter means therefor accommodating mounting of the gear mechanism on a motor meeting military standard specifications as to front end configuration and providing, in turn, a front end configuration for the assembly which meets the same standards. In accordance with this aspect of the invention, an adapter ring 16 is provided which has the same outside diameter as the motor 10 and is provided with an axial flange 65 extending along the sides of the boss 13 and into engagement with the shoulder 15. The adapter also is provided with a radially inwardly projecting flange 66 which extends over the front face of the boss 13 and has an axial thickness somewhat greater than the central motor boss 12. The adapter ring 16 is provided about its front face with four recessed holes or bores 67 spaced to coincide with the threaded bores 14 provided on the motor boss 13 in conformity to the military specifications. Thus, when the adapter is applied over the front of the motor, the bores 67 may be aligned with the threaded bores 14 and the adapter secured to the front face of the motor by means of a plurality of screws 68.

In accordance with the invention, the adapter ring 16 is also provided with a plurality of tapped bores 69, advantageously spaced uniformly about the ring, between the recessed bores 67, and spaced radially outward from the bores 67. By way of example, the recessed bores 67 may be located at a radius of 0.550 inch, while the tapped bores 69 are located at a radius of 0.594 inch, in an assembly having an outside diameter of 1.437 inches.

The gear housing 17, comprising housing parts 19, 20 secured together by the bolts 21, has an outside diameter equal to that of the motor 10 and is provided at its rearward end with a boss 70 adapted to be received closely within the circular recess defined by the flange 66 of the adapter 16. The housing 17 is thus located in coaxial relation to the motor 10, in the desired manner. The housing 17 is provided with a plurality of bores 71, located to correspond in alignment with the tapped bores 69 of the adapter ring. The bores 71 receive elongated bolts 72, which extend through the housing and engage the threaded bores 69, whereby the housing may be secured rigidly to the adapter 16. The bolts 72 are thus located radially outward from the standard mounting holes 14 of the motor casing, providing greater room within the gear housing for accommodating a rotating cage of gears.

In the illustrated form of the invention, the heads of the bolts 72 lie outside of the diameter specified by military standards for the boss 13. Accordingly, the bolt heads are made flush with a shoulder 73 recessed from the front end of the housing part 19 and surrounding a central boss 74 thereof. The boss 74 has the same diameter as the motor boss 12, but has a considerably greater axial length. Accordingly, a second adapter 18 is provided, which is in the form of a ring received closely about the boss 74 and abutting the shoulder 73. The adapter 18 is provided with a plurality of recessed holes 75, in which are received screws 76 for securing the adapter to the gear housing. The outer diameter of the adapter 18 is equal to the diameter of the motor boss 13, and the axial length of the adapter is likewise equal to the axial length of the motor boss 13. In addition, the central boss 74 of the gear housing projects forward from the front surface of the adapter 18 an amount equal to the axial length of the motor boss 12. The adapter 18 also is provided with a plurality of tapped holes 77 corresponding in size, number and location to the holes 14 at the front of the motor 10, so that the front end configuration of the complete assembly is, in all substantial respects, similar to that of the motor 10.

The improved arrangement of the gear housing and adapters 16, 18 is such as to provide for substantially increased operating area within the gear housing, by providing for the location of the main attachment bolts 72 radially outward from the standard mounting holes 14 specified by the military standards. Substantial practical advantages are realized by this expedient, in that the operating parts of the gear mechanism may be made larger, to facilitate the manufacture thereof and also to provide a more rugged and durable mechanism.

One of the most important advantages of the new mechanism resides in the provision, in a miniaturized, high-ratio gear reduction mechanism of an arrangement whereby the output shaft is journalled at both the front and rear of the gear housing. This represents a marked improvement over gear mechanisms of known design, in which the output shaft, by reason of severe space limitations, has been journalled only at the front of the housing, in a more or less cantilever fashion. The improved mounting arrangement is made possible by providing as, in effect, an integral part of the output shaft, a rotating cage of gears driven by a motor shaft received in an axial recess of the output shaft. This permits the rear bearing of the output shaft to be located rearwardly of the forward end of the motor shaft. In addition, the improved mechanism may be rendered highly compact, in relation to the reduction ratio thereof without the introduction of difficult manufacturing problems.

It should be understood, however, that the specific forms of the invention herein illustrated and described are intended to be representative only, as certain changes may be made therein without departing from the clear teachings of the disclosure. Accordingly, reference should be made to the following appended claims in determining the full scope of the invention.

We claim:

1. A gear reduction assembly for a miniaturized motor, comprising a housing having spaced end walls and adapted to be secured to the end of the motor, one of the end walls having an opening therein for receiving a projecting rotor shaft of the motor, the rotor shaft having gear means thereon, an output shaft journalled at spaced points adjacent said end walls and having a portion projecting outwardly of the outer end wall, the output shaft having an axial recess in its inner end coaxially receiving the projecting end of the rotor shaft, the output shaft having a side wall recess communicating with the axial recess and exposing a portion of the rotor shaft, two opposed axially spaced supports extending radially from the output shaft adjacent the journals therefor and forming a cage structure, a gear shaft journalled in the supports and mounting a drive gear, the drive gear extending through the side wall recess and meshing with the rotor shaft gear means, a stationary gear fixed to the housing, and intermediate gear means interconnecting the drive and stationary gears.

2. The gear reduction assembly of claim 1, in which the stationary gear is a ring gear surrounding the cage structure, and the intermediate gear means includes a gear journalled by the cage structure, meshing with the ring gear and driven by the drive gear.

3. The gear reduction assembly of claim 1, in which the intermediate gear means comprises an intermediate shaft journalled by the cage structure and mounting large and small diameter intermediate gears, the large diameter gear is of such diameter in relation to the spacing between its axis and that of the output shaft as to have an interfering portion lying within the outline of the output shaft, and the output shaft is provided with a second side wall recess for the accommodation of the interfering portion.

4. The gear reduction assembly of claim 3, in which the gear shaft and the intermediate shaft are substantially diametrically opposed on opposite sides of the output shaft, and the side wall recesses in the output shaft are substantially diametrically opposed.

5. The gear reduction assembly of claim 4, in which there is a plurality of intermediate shafts journalled by the cage structure, the gear and intermediate shafts are spaced regularly about the output shaft, each of the intermediate shafts has a large diameter gear having an interfering portion lying within the outline of the output shaft, pairs of the large diameter gears are positioned in diametrically opposed relation and spaced axially and shifted angularly from other pairs of large diameter gears, and axially spaced, angularly shifted pairs of opposed side wall recesses are provided in the output shaft for the accommodation of the interfering portions of the large diameter gears.

6. The combination of the gear reduction assembly of claim 1 and a miniaturized motor, in which the motor has a casing of cylindrical outline, the casing has a front wall from which extends an axially aligned rotor shaft, concentric cylindrical pilot and aligning bosses extend forward from the casing front wall, the pilot boss is of smaller diameter than the motor casing and the aligning boss is of smaller diameter than the pilot boss and extends forward therefrom whereby the outer portions of the front surface of the pilot boss forms an annular shoulder, the annular shoulder is provided with tapped holes to receive fastening elements, an annular adapter ring having an outer diameter equal to that of the motor casing is received over the pilot and aligning bosses and secured to the motor casing by fastening elements received in the tapped holes, the adapter ring is provided with tapped holes spaced radially outward of the rotor shaft a greater distance than the tapped holes of the shoulder, the housing of the gear reduction assembly is of cylindrical form and has a diameter equal to that of the motor casing, elongated fastening elements extend axially throughout the assembly housing and engage the tapped holes in the adapter ring to secure together the motor casing and assembly housing, and means are provided at the front end of the assembly housing to form tapped holes spaced from the rotor shaft axis a distance equal to the spacing of the tapped holes in the motor casing.

7. The combination of claim 6, in which the axial thickness of the adapter ring is greater than the combined projection of the pilot and aligning bosses, whereby the front portion of the adapter ring defines a circular recess and the back wall of the assembly housing has a projecting cylindrical boss received in the circular recess.

8. The combination of claim 6, in which the assembly housing is formed of aluminum and has a boss extending forward therefrom equal in diameter to the aligning boss but of greater axial length than the aligning boss, an annular pilot ring is received over the forwardly extending housing boss and secured to the housing, the pilot ring is equal in diameter to the pilot boss and of lesser axial length than the housing boss, and the pilot ring is formed of steel and is provided with tapped holes spaced from the rotor axis a distance equal to the spacing of the tapped holes in the motor casing.

References Cited in the file of this patent

UNITED STATES PATENTS

| | | |
|---|---|---|
| 2,600,697 | Schmitter | June 17, 1952 |
| 2,782,656 | McCarthy et al. | Feb. 26, 1957 |
| 2,810,844 | Morrill | Oct. 22, 1957 |
| 2,825,247 | Haworth et al. | Mar. 4, 1958 |
| 2,883,880 | Merkle | Apr. 28, 1959 |
| 2,892,357 | Bachman | June 30, 1959 |
| 2,936,644 | Miller | May 17, 1960 |